United States Patent [19]

Grube

[11] 3,775,833
[45] Dec. 4, 1973

[54] METHOD OF SECURING FASTENERS TO SHEET MATERIAL

[75] Inventor: William L. Grube, Lake Bluff, Ill.

[73] Assignee: MacLean-Fogg Lock Nut Co., Mundelein, Ill.

[22] Filed: Apr. 20, 1972

[21] Appl. No.: 245,765

Related U.S. Application Data

[62] Division of Ser. No. 13,007, Feb. 20, 1970, Pat. No. 3,693,237.

[52] U.S. Cl. ............................. 29/470.1, 29/509
[51] Int. Cl. ..................................... B23k 21/00
[58] Field of Search ............... 29/432, 432.2, 470.1, 29/509; 151/41.72, 41.73

[56] References Cited
UNITED STATES PATENTS

| | | | |
|---|---|---|---|
| 2,750,660 | 6/1956 | Newcomb | 29/432 |
| 2,784,930 | 3/1957 | Wernecke | 29/432 UX |
| 2,799,188 | 7/1957 | Newcomb | 29/432 X |
| 3,091,843 | 6/1963 | Double et al. | 29/509 X |
| 3,198,874 | 8/1965 | Dahl | 29/470.1 X |
| 3,229,363 | 1/1966 | Bien | 29/432 |

Primary Examiner—Charlie T. Moon
Attorney—James A. Davis et al.

[57] ABSTRACT

A method of attaching a pierce nut to a panel is disclosed wherein by a single stroke of a ram a threaded fastener, such as a nut, acts as a punch and pierces its own hole in the sheet metal panel to which it is to be fastened. The nut has one or more laterally extending flanges which abut upon one side of the said panel, the corners of the nut being displaced laterally in the die associated with the piercing operation, preferably under the flange, to clinch the material therebetween. The panel is also displaced at the displaced region of the nut and in the same general direction as the displaced region of the nut. The method is not dependent upon any particular thickness, hardness or ductility of the material of the panel, nor does the nut need to have any predetermined hardness. The displaced material of the nut and panel is compressed together to form, in effect, a cold weld, but it is not confined laterally, thereby avoiding binding of the displaced material in the back-up die used to displace the materials.

6 Claims, 18 Drawing Figures

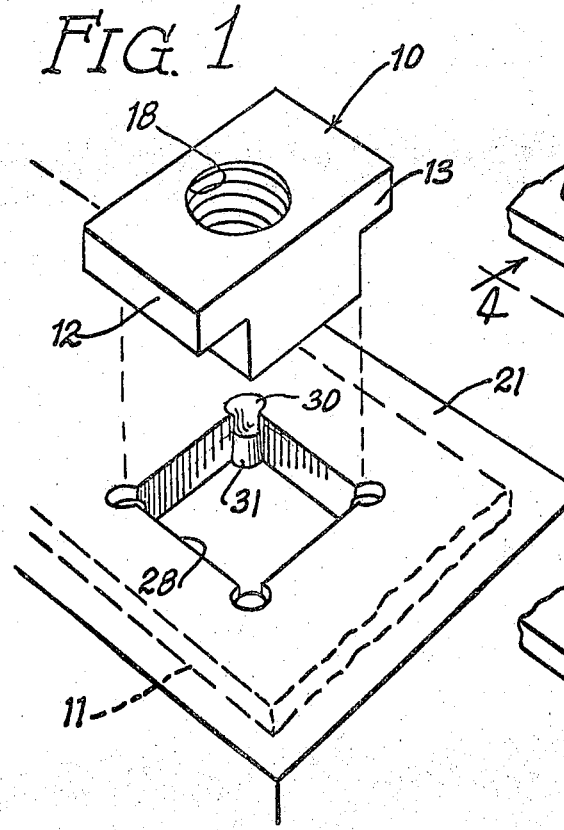

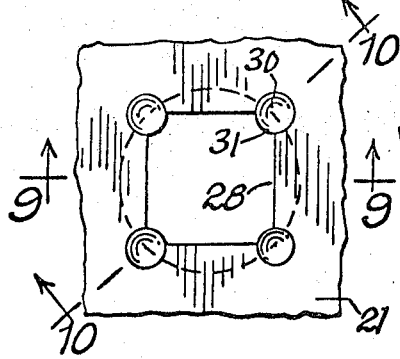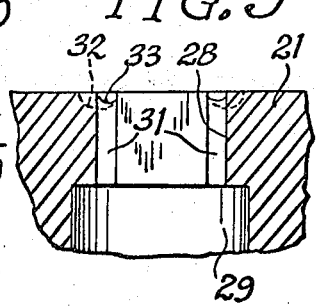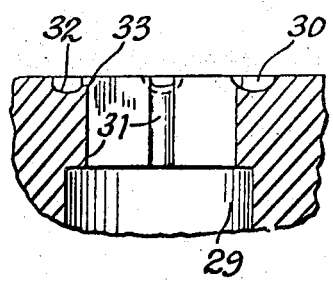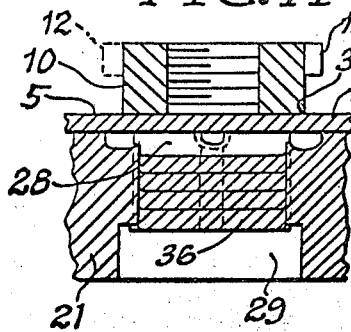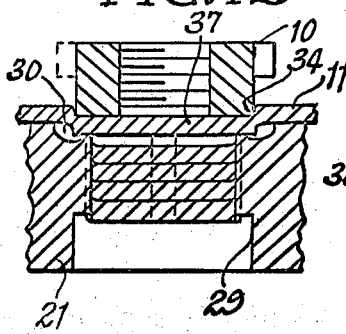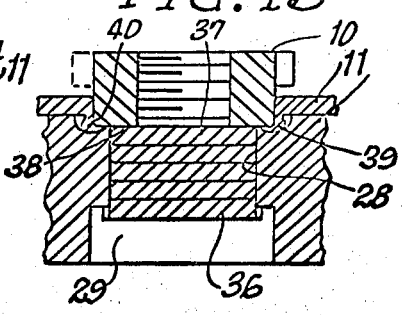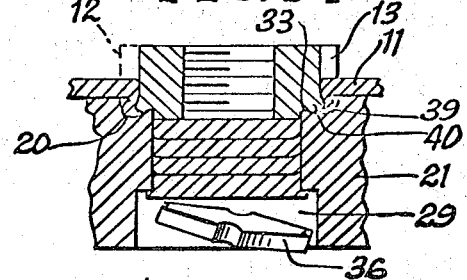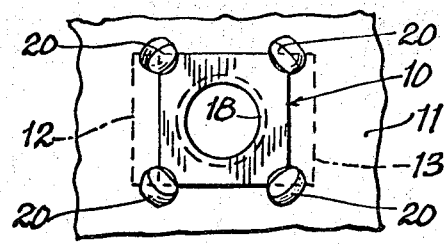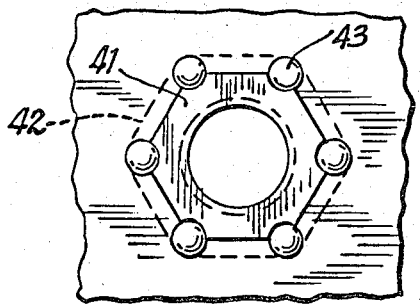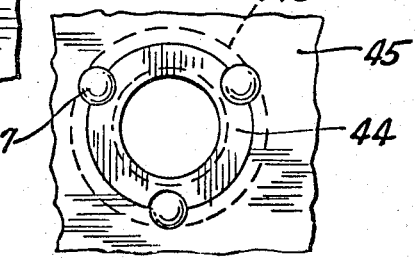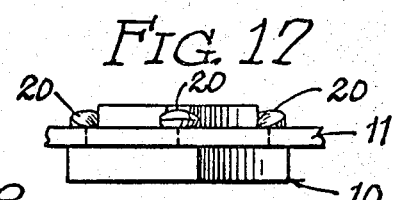

METHOD OF SECURING FASTENERS TO SHEET MATERIAL

This application is a division of my co-pending application Ser. No. 13,007, filed Feb. 20, 1970, now U.S. Pat. No. 3,693,237, for METHOD OF SECURING FASTENERS TO SHEET MATERIAL AND RESULTING STRUCTURE.

This invention relates to an improved method of securing self-piercing fasteners to sheet material by deforming portions of the fastener and material. For purposes of illustration this invention will be described with reference to affixing internally threaded sections of metal such as nuts to sheet metal, although it is understood that it may be applied as well to securing other devices such as screws, bolts and pins to such sheet metal.

Self-piercing fasteners are understood to be fasteners which are used as punches to form the opening in sheet metal through which they are to extend and in which they are to be non-rotatively secured. There are at present two general methods for piercing a sheet metal panel with a fastener and securing the piercing fastener to the sheet. The first and most widely used requires that the fastener be formed adjacent the nose or pilot part first entering the sheet metal, with a portion of the fastener reduced in cross-sectional area by undercutting, grooving or the like. The sheet material adjacent the portion of reduced area is then forced by a coining, swaging or die forming process, to move laterally into the reduced area to form a lock between the fastener and sheet metal. This method requires a predetermined strength and ductility in the sheet material and a very critical adjustment of the final position of the mechanism used to force the metal into the reduced area. Too litle force will result in an insufficient movement of the sheet material and a correspondingly weak interlock between the fastener and material, and too much force will weaken the material itself. Furthermore, the formation of reduced area in the fastener is difficult to achieve on equipment designed for high volume production of either cold or hot formed fasterners.

The second method does not require a portion of reduced cross-section in the fastener, but requires instead that the pilot of the fastener, i.e., the part of the fastener used as a punch to pierce the sheet material, after it passes through the sheet material, will be deformed to spread over the adjacent material to form the necessary interlock or clinch therewith. Several difficulties are inherent in this method. One of these difficulties is that the deformation can only be accomplished by a step in the back-up die which is contacted by the pilot of the fastener, and the entire pilot is then subjected to compression stress. If a relatively large clearance has been used between the periphery of the pilot and the shear edge of the die, the rest of the compressive stress will be dissipated in expanding the pilot into the clearance space, with very little left to deform the pilot over the material itself to form the interlock. With a very weak interlock, the force required to pull the nut back out of the sheet material will be very low and the overall durability of the final structure will be poor. In the majority of instances, there is no interlock at all, the pilot merely expanding or upsetting in the opening pierced in the sheet material to result in a frictional hold rather than a mechanical interlock. Another difficulty is that if the die clearance is taken at its maximum, or if the stroke of the tool pushing the pilot through the material is not carefully controlled, the fastener may expand and lodge within the die. There is thus little or no residual space into which the volume of deformed material may flow. Yet another difficulty inherent in this method is that the slugs or pieces of sheet metal cut out by the pilot as it passes through the sheet will tend to lodge or pile up between the step in the back-up die and the pilot of the fastener.

It is the object of this invention to provide a method of forming an interlock between a fastener and a sheet pierced by a pilot portion of the fastener, said method providing ample space for the expansion of displaced material of the pilot used to form the interlock.

A more specific object of this invention is the provision of a method of forming an interlock between a fastener and a sheet pierced by a pilot portion of the fastener, said method including the steps of deforming specific areas about the periphery of the pilot portion, and deforming portions of the sheet by the deformed portions of the pilot to form said interlock.

Yet another object of this invention is to provide a method of forming an interlock between a fastener having a pilot portion on the end thereof adjacent a laterally extending flange, and a sheet adapted to be pierced by said pilot, said method including the steps of successively pushing the material of the sheet cut out by the pilot through a back-up die while deforming selected areas of the pilot and adjacent sheet to clinch the sheet between the flange and deformed areas.

A further object of this invention is to provide an interlock between a flanged fastener and a sheet of material by expanding selected areas of the pilot of the fastener and cold welding to said expanded areas material of the sheet adjacent thereto to form a strong interlock.

These and other objects of this invention will become apparent from the following detailed description of a preferred form of the invention when taken together with the accompanying drawings in which:

FIG. 1 is an exploded plan view in perspective of a fastener and die made in accordance with this invention, the fastener performing the function of a punch relative to a sheet placed over the die;

FIG. 2 is a plan view in perspective of an assembled fastener and sheet;

FIG. 3 is a bottom view in perspective of the assembled fastener and sheet of FIG. 2;

FIGS. 4 and 5 are respectively front and side elevational views of the assembly of FIG. 2;

FIG. 6 is a diagonal elevation in section of the assembly of FIG. 2 taken along line 6—6 thereof;

FIG. 7 is an enlarged view of a portion of the section of FIG. 6;

FIG. 8 is a fragmentary plan view of the die of FIG. 1;

FIGS. 9 and 10 are elevations in section of the die of FIG. 8, the sections being taken along lines 9—9 and 10—10, respectively, of FIG. 8;

FIGS. 11, 12, 13 and 14 are sections in elevation of the die similar to FIG. 10, showing the progressive steps in the formation of the assembled fastener and sheet;

FIG. 15 is a bottom view of the assembled fastener and sheet; and

FIGS. 16, 17 and 18 are respectively plan, side and plan views of modifications of the fastener of FIG. 1.

The invention in general comprises forming the fastener with a lateral abutment which may take the form of a flange extending partly or entirely around the fastener, depending upon the configuration of the fastener. An axially adjacent part of the fastener which does not have the flange is used as a pilot to be brought down against and through the sheet material to which the fastener is to be secured. A back-up die under the material has an opening to receive the pilot, the opening having a configuration corresponding to that of the pilot except for small areas which extend into the opening in the path of the pilot. The upper portions of these areas are relieved to form steps having concave, semi-sperical or dimple-like upper surfaces. The inner edges of these surfaces form gouges which displace the metal in the sides of the pilot. This displaced metal moves down and laterally outward from the pilot along the concave surfaces taking with it adjacent portions of the material of the sheet which adjacent portions become welded to it and serve to increase the size and strength of the displaced metal.

Referring now to the drawings for a detailed description of the preferred embodiments depicted therein, there is disclosed in FIGS. 2 and 3 a nut 10 which has been secured to a section of sheet metal 11 by the method of this invention. As shown in FIG. 1, nut 10, for purposes of illustration, has a rectangular section at the upper end of which are formed a pair of oppositely disposed laterally extending flanges 12 and 13. It is understood that nut 10 may have any number of sides, and it may in fact be a cylinder, but in the form selected to illustrate this invention, nut 10 has four sides 14, 15, 16 and 17, and flanges 12 and 13 extend laterally from opposite sides 14 and 16. Nut 10 is formed with a threaded opening 18 adapted to receive an externally threaded fastener such as a bolt or screw.

It is comtemplated that nut 10 will be non-rotatively secured to sheet 11, said sheet being of metal and comprising a panel or wall of a structure, receptacle or the like. Thus, nut 10 is received in an opening 19 formed in sheet material 11 by the nut itself in a piercing operation hereinafter to be described in detail. Nut 10 therefore fits snugly in opening 19 and is held against rotation relative to sheet 11. It is also restrained against moving out of opening 19 by deformations 20 in both the nut and sheet, said deformations, in accordance with this invention, being formed with a single stroke with the aid of a back-up die 21, the deformations being formed on the side of sheet material 11 opposite that against which flanges 12 and 13 bear. In the form of the invention selected for illustrative purposes herein, the deformations 20 are disposed at the corners of the nut, and take the form, in plan view, of somewhat frusto-spherical bosses scooped or gouged out of the corners to leave concave arcuate grooves 22, 23, 24 and 25 in said corners. As shown in FIGS. 4—7 inclusive, each of the bosses is comprised of material 26 originating in nut 10 and material 27 originating in sheet material 11. As shown more clearly in FIG. 7, the material 26 from nut 10 and the material 27 from sheet material 11 is compressed together in an axial direction in a manner to bond the two together to make a substantially integral boss 20.

It may be apparent from the description thus far given that bosses 20 and flanges 12 and 13 clinch sheet material 11 between them to hold nut 10 against axial movement out of opening 19 in sheet material 11.

Referring now to FIGS. 8, 9 and 10, back-up die 21 has an opening 28 which is of the same configuration as the portion of nut 10 below flanges 12 and 13, and of depth sufficient to give the die the necessary strength to resist deformation under the shear stresses required to pierce sheet material 11. It has been found that a depth equal to approximately five thicknesses of sheet material 11 is sufficient for this purpose. Die 21 has an enlarged opening 29 immediately below opening 28 to receive the material punched out of sheet 11 by nut 10. Circular depressions 30 are formed in the corners of opening 28, said die 21 having inwarldy extending steps 31 at each corner generally completing the circular profile of the depresseions 30.

The surface 32 of each depression 30 is concave, semi-spherical or dimple-like and terminates in a somewhat rounded edge 33 where surface 32 intersects the surface of the inwardly projecting steps 31. The deformations or bosses 20 are formed in the circular depressions 30 in the following manner:

Referring to FIGS. 11–14, back-up die 21 is shown with the sheet material 11 placed thereon and with a nut 10 placed over sheet 11 in axial alignment with the opening 28 in die 21. The view in FIGS. 11–14 is taken along a diagonal across the opening 28 and is the same view as in FIG. 10. Nut 10 is intended to form its own opening in sheet material 11 and to that end, it is only necessary that the edges 34 at the bottom of nut 10 and forming collectively the periphery of said nut at sheet 11, be reasonably sharp and that the sides 14, 15, 16 and 17 of the nut be parallel with the axis of the nut or perpendicular to the upper surface 35 of sheet material 11. It is assumed in the stage shown in FIG. 11 that several nuts have been previously applied to sheet material with the aid of die 21 so that opening 28 has a number of slugs 36 frictionally retained therein, each slug having been progressively pushed downwardly through opening 28 by the next succeeding slug.

The first stage in the movement of nut 10 into opening 28 in die 21 is shown in FIG. 12. In this stage, the edges 34 of nut 10, acting as shear edges, have partially sheared a slug 37 from sheet 11, the portions of sheet 11 over circular depressions 30 however being merely displaced axially downwardly into said depressions 30. At the stage shown in FIG. 12, slug 37 is in contact at its corners with the rounded edge 33 at the inner ends of steps 31.

The next stage in the movement of nut 10 into opening 28 is shown in FIG. 13, and at this stage the bottom surface 38 of nut 10 has contacted the rounded edges 33 and the material of sheet 10 which was disposed over depressions 30 has been displaced downwardly and laterally outwardly into said depressions 30.

The amount of material from sheet 11 displaced into the depressions 30, however, is not sufficient to fill said depressions. It may be noted that the completed slug 37 has now pushed a preceding slug 36 into the clearance opening 29 and that the lowermost slug 36 is substantially half way out of the opening 28.

The final stage in the movement of nut 10 into opening 28 is shown in FIG. 14. In this stage, the edges 33 at the inner ends of concave surfaces 32 have now cut into the corners of bottom surface 38 on nut 10 and, because of the concave nature of said surfaces 32, the material in the corners of nut 10 has been displaced laterally outwardly against the previously displaced material of sheet 11 in these depressions 30 to continue the movement of said displaced sheet material into the depressions 30. It may be noted that even at the bottom of the stroke of nut 10, the depressions 30 still are not completely filled, so that there is no binding effect created between the nut and die by virtue of the displaced material. The material of sheet 11 displaced by nut 10 into depressions 30 is shown at 39 in FIGS. 13 and 14 and the material of nut 10 displaced by the die is shown at 40 in FIG. 14. As shown in FIG. 13, the material from the nut is forced upon concave surface 32 and compressed against and partly under the previously displaced material 39 from sheet 11. The pressure is sufficient to form an integral boss 20 wherein the material from both the nut and the sheet have, in effect, been cold welded together. The movement of nut 10 to its final stage in opening 28 has caused the lowermost plug 36 to be ejected into the clearance space 29 in die 21. Sheet 11 may now be lifted off die 21, and nut 10 will be firmly clinched upon sheet 11 by the flanges 12 and 13 on the one side and the bosses 20 on the other.

Since nut 10 acts as a punch to shear slugs 36 from sheet 11, it must be of sufficient thickness to withstand the compressive force exerted thereupon during the piercing operation without exceeding its maximum compression strength.

Depressions 30 are shown generally circular in outline. They may have any other shape desired, the circular form being the simplest and most economical to make. Similary, the inwardly projecting steps 31 need not be a continuation of the contour of the depressions 30 but they need only to be so related to the depressions that the volume of material displaced from the sheet 11 and nut 10 will not exceed the volume of the space in said depression 30.

Opening 28 in die 21 and the inwardly projecting steps 31 can readily be formed in a single operation by the use of a broach. Depressions 30 can be formed equally as readily with the use of an appropriately shaped end mill.

It may be noted in FIG. 12 that nut 10 has moved approximately one-half the thickness of material 11 toward die 21, and it may be taken as one of the criteria for the design of the die 21 that in FIG. 12 stage the nut will move one-half the thickness of the material toward die 21 so that the material 11 will be definitely sheared by the die 21 around the periphery of the opening between depressions 30. At the depressions, however, the material disposed above said depressions is extruded, rather than sheared, so that whatever material enters the depressions is still a part of sheet 11. The ductility of the material of sheet 11, however, will have some effect upon the location of the end of the shear and the commencement of the extrusion of the material. Generally, this commencement of the extrusion process will occur where the straight edge of the opening 28 intersects the rounded edge 33, but it is possible that once shear has been propagated in a very brittle sheet material, it may well contine along the shear edge into the depressions 30 where it terminates against the shear propagated at right angles from the adjacent edge. However, complete shearing of the material in depressions 30 will not affect the successful formation of the bosses 20, since the compressive stresses imposed upon the material in the bosses causes the material to reunite with the sheet at the end of the stroke of nut 10.

Although a line of demarcation has been shown in the drawings between the material of the sheet 11 and the material of nut 10 in depressions 30, actually, in the final structure, this line cannot be seen, since the two materials have been compressed together by the die and nut and have become bonded together.

Thus by a single stroke of a punch, nut 10 has pierced an opening in sheet 11 and has been clinched to the sheet on both sides of the openings. A stronger clinching action has been achieved so that the nut will resist a greater axial pull while at the same time avoiding any binding effect of the clinched nut in the back-up die. The avoidance of a binding effect results from the generally circular outline of the depressions 30. The material of the nut as it enters the depression encounters initially a section of the depression which progressively increases in volume until the midpoint of the depression is reached. No binding can occur under these conditions. Thereafter the material encounters a section of the depression which progressively decreases in volume. As the material moves into the latter section it encounters progressively increasing resistance, but not an absolute block until the depression is completely filled.

FIG. 16 shows the method of this invention applied to a hexagonal nut 41. In this case, a continuous flange 42 (shown dotted) may be used where maximum strength is desired. The bosses formed by this method are shown at 43, said bosses being six in number corresponding to the six corners available in a hexagonal nut. The back-up die (not shown) by which bosses 43 are formed is made in accordance with the principles set forth in connection with die 21.

In FIG. 18 is shown a threaded cylindrical fastener 44 which has also been applied to a sheet 45 by the method of this invention. In this case, a continuous flange 46 (shown dotted) may also be used, and the number of bosses 47 may be selected to provide the necessary resistance to removal from the opening punched in sheet 45 by the fastener 44. It is preferred that whatever number of bosses be selected, they be equidistantly spaced from one another to provide uniform strength and resistance against removal of the sleeve from the sheet 45.

Since the threaded opening in any of the abovementioned fasteners 10, 41 and 44 is not utilized in the process of this invention, it may be apparent that the said process may be used to secure the heads of screws or bolts to a sheet or panel, or to secure pins or shafts to a panel when such pins or shafts are provided with an appropriate head.

Thus it is understood that this invention is not limited in its scope to the method hereinabove described, but its scope is to be determined instead by the appended claims.

I claim:

1. The method of securing to a metal panel a metal element having mounting flanges extending laterally from a relatively thick pilot portion projecting through an opening in said metal panel, which opening conforms generally to the pilot portion, and which method comprises the steps of gouging segments of metal from restricted and separated portions of said pilot portion of the metal element while continuously forcing the gouged metal segments laterally away from the pilot portion whithout the complete severance thereof from the metal element and on the side of the panel opposite the side against which the mouting flange bears, displacing metal of the panel laterally by the lateral displacement of the metal segments from the pilot portion, spreading and forming the displaced metal and that of the segments gouged from the pilot portion into a forming die having cavities to receive said displaced metal and that of the segments, at least some of said cavities having a section adjacent the pilot portion of progressively increasing volume joined to a section of progressively decreasing volume, and then compressing the metal in the forming die cavities against the adjacent surface of the panel to form securement bosses, said compressing step intitially promoting free flow of the displaced metal as it moves into the section of progressively increasing volume and then interposing progressively increased resistance to the flow of the displaced metal as it moves into the section of progressively decreasing volume.

2. The method as defined in claim 1, comprising the further step of moving metal from the panel around the ends of the metal gouged from the metal element prior to compressing the gouged metal to form an interlock with said gouged metal.

3. The method as defined in claim 2, comprising the further step of compressing the metal moved from the panel and the gouged metal together to form a cold weld therebetween.

4. The method as defined in claim 2, comprising the further steps of guiding the gouged metal along a curvilinear surface outwardly of the metal element behind the moved metal of the panel and into the cavities in the forming die and compressing the metal moved from the panel and the gouged metal together to form a cold weld therebetween.

5. The method as defined in claim 1, said pilot portion having a rectangular section, said die cavities being disposed exterior to the rectangular section at the corners thereof such that the opening in said metal panel does not conform to the shape of the forming die at its corners, the method comprising the further step of moving portions of the panel at the corners of the forming die into said cavitites ahead of the pilot portion of the element, and said step of compressing the metal in the forming die cavities comprising gouging said segments from the corners of the pilot portion and moving said gouged segments in the cavities laterally against the said portions of the panel at the corners of the forming die to move said portions of the panel in the cavities around said gouged segments.

6. The method as defined in Claim 1, said at least some of said cavities having substantially circular perimeters outwardly of the pilot portion to give said securement bosses substantially convex form.

* * * * *